(12) United States Patent
Khin et al.

(10) Patent No.: US 8,046,819 B2
(45) Date of Patent: Oct. 25, 2011

(54) METHODS AND SYSTEMS FOR DETERMINING SECURITY REQUIREMENTS FOR AN INFORMATION RESOURCE

(75) Inventors: Peter Myo Khin, Silver Spring, MD (US); Zoë Camilla Claire Strickland, Washington, DC (US); James Leslie Golden, Potomac Falls, VA (US); Raymond J. Iandolo, Raleigh, NC (US); Kevin J. Ryan, Ben Lomond, CA (US)

(73) Assignee: United States Postal Service, Washington, DC (US)

( * ) Notice: Subject to any disclaimer, the term of this patent is extended or adjusted under 35 U.S.C. 154(b) by 1155 days.

(21) Appl. No.: 10/850,292

(22) Filed: May 20, 2004

(65) Prior Publication Data
US 2005/0132188 A1    Jun. 16, 2005

Related U.S. Application Data

(60) Provisional application No. 60/471,970, filed on May 20, 2003.

(51) Int. Cl.
*G06F 17/00* (2006.01)
*G06F 7/04* (2006.01)
(52) U.S. Cl. ............................................. 726/1; 726/26
(58) Field of Classification Search .................. 713/166; 726/2, 1, 25, 26
See application file for complete search history.

(56) References Cited

U.S. PATENT DOCUMENTS

| | | | | |
|---|---|---|---|---|
| 5,621,887 A | * | 4/1997 | Chatterji | 714/42 |
| 5,787,428 A | * | 7/1998 | Hart | 707/9 |
| 5,826,268 A | * | 10/1998 | Schaefer et al. | 707/9 |
| 6,105,027 A | * | 8/2000 | Schneider et al. | 707/9 |
| 6,480,850 B1 | | 11/2002 | Veldhuisen | |
| 6,480,963 B1 | * | 11/2002 | Tachibana et al. | 726/4 |
| 6,904,417 B2 | | 6/2005 | Clayton et al. | |
| 6,925,443 B1 | | 8/2005 | Baggett, Jr. et al. | |

(Continued)

FOREIGN PATENT DOCUMENTS
WO    WO2004104788    12/2004

OTHER PUBLICATIONS

Notification Concerning Transmittal of International Preliminary Report on Patentability (Chapter I of the Patent Cooperation Treaty); International Application No. PCT/US2004/015870; Jan. 4, 2005 (8 pages).

(Continued)

*Primary Examiner* — Eleni Shiferaw
*Assistant Examiner* — Ali Abyaneh
(74) *Attorney, Agent, or Firm* — Finnegan, Henderson, Farabow, Garrett & Dunner, LLP

(57) ABSTRACT

Systems and methods for determining security requirements for an information resource may comprise determining a sensitivity level and a criticality level associated with the information resource. In addition, the systems and methods may include determining the security requirements for the information resource based on at least one of the sensitivity level and the criticality level. Moreover, the systems and methods may include determining a recovery time objective for the information resource and insuring that information used in determining the security requirements adheres to privacy requirements. The sensitivity level may be derived from privacy requirements of information maintained by the information resource. For example, the sensitivity level and resulting security requirements may be based on a need to meet privacy requirements by protecting confidentiality or integrity of the information resource.

48 Claims, 20 Drawing Sheets

U.S. PATENT DOCUMENTS

| | | | |
|---|---|---|---|
| 7,234,065 | B2 | 6/2007 | Breslin et al. |
| 7,260,830 | B2 | 8/2007 | Sugimoto |
| 7,281,020 | B2 | 10/2007 | Fine |
| 7,478,157 | B2 | 1/2009 | Bohrer et al. |
| 7,552,480 | B1 * | 6/2009 | Voss ................................ 726/25 |
| 2003/0233438 | A1 * | 12/2003 | Hutchinson et al. .......... 709/223 |
| 2008/0028435 | A1 | 1/2008 | Strickland et al. |

OTHER PUBLICATIONS

Notification of Transmittal of The International Search Report and the Written Opinion of the International Searching Authority, or the Declaration; International Application No. PCT/US04/15870; Jan. 4, 2005 (4 pages).

Written Opinion of the International Searching Authority; International Application No. PCT/US04/15870; Jan. 4, 2005 (7 pages).

Office Action mailed Nov. 10, 2009 in U.S. Appl. No. 11/705,412, 11 pp.

Office Action mailed Jun. 23, 2010 in U.S. Appl. No. 11/705,412, 22 pp.

Final Office Action mailed Dec. 9, 2010 in U.S. Appl. No. 11/705,412, 21 pp.

* cited by examiner

PROJECT IDENTIFICATION

| IDENTIFICATION | | | |
|---|---|---|---|
| INFORMATION RESOURCE NAME: | | | |
| ISA NUMBER: | | EIR NUMBER: | |
| CONTACT INFORMATION | | | |
| Functional Vice President: | | Other: | |
| Telephone Number: | | Telephone Number: | |
| Email Address: | | Email Address: | |
| Executive Sponsor: | | Executive Sponsor Designee: | |
| Telephone Number: | | Telephone Number: | |
| Email Address: | | Email Address: | |
| Portfolio/Business Mgr.: | | Portfolio/Business Mgr. Designee: | |
| Telephone Number: | | Telephone Number: | |
| Email Address: | | Email Address: | |
| Program Manager: | | Project Manager: | |
| Telephone Number: | | Telephone Number: | |
| Email Address: | | Email Address: | |
| ISSO: | | ISSR/DEVPOC: | |
| Telephone Number: | | Telephone Number: | |
| Email Address: | | Email Address: | |
| DEVELOPMENT AND PRODUCTION | | | |
| Development Organization: | | | |
| Development Site: | | | |
| Production Site(s): | | | |

*FIG. 4*

The Privacy Act of 1974

The Privacy Act of 1974 places restrictions on the collection, use, and dissemination of information relating to customers or employees that is maintained by an agency, including the USPS. The USPS must create and maintain a system of records for programs or systems where information is retrieved by customer or employee name or other identifier.

| 1. | | Does the program or system collect or store data related to a customer or employee where data is retrieved by name, unique number, symbol, or other identifier assigned to the customer or employee? |
|---|---|---|
| ☐ | | No (If "No," skip to 2.2.) |
| ☐ | | Yes (If "Yes," a Privacy Act system of records is required. Answer 1a – 1h.) |
| | a) | Is this a new system of records? (See ASM and Privacy Office for assistance if a new system is needed or to modify an existing system.) |
| | ☐ | No |
| | ☐ | Yes (If "Yes," contact Privacy Office) |
| | b) | Name the System of Records you will be using: (If you need further information, see Privacy Office.) |
| | | |
| | c) | When is the new or modified program or system expected to be operational? (mm/dd/yyyy) |
| | | |
| | d) | How long does the system indicate documents will be retained? (Explain process by which documents will be purged at the end of that time period.) |
| | | |
| | e) | If a customer or employee is asked to supply information, a Privacy Act notice is required (distinct from privacy policy on usps.com). The notice must provide the following: (All boxes must be checked or contact Privacy Office for assistance.) |
| | ☐ | The principal purpose(s) for which the information will be used. |
| | ☐ | The authority which authorizes the collection of the information. |
| | ☐ | Whether providing the information is voluntary, and the effects, if any, of not providing it. |
| | ☐ | The routine uses (disclosures) which may be made of the information. |
| | f) | The Privacy Act Notice must be available at the time information is collected. (One or more boxes must be checked or contact Privacy Office.) |
| | ☐ | For Web sites, notice is provided in text where the information is collected, or can be accessed via link. |
| | ☐ | For forms or other documents where data is collected, notice is on the document or form, and can be retained by the customer or employee. |

*FIG. 5*

| | g) | Check all boxes that indicate how customers or employees may access data the USPS maintains on them, and how they may request a correction or amendment. (One or more boxes must be checked.) |
|---|---|---|
| | ☐ | With a link that leads to accessing information on the Web site. |
| | ☐ | By providing specific written instructions on how to gain access to and correct their information. |
| | ☐ | By providing a phone number of a USPS representative who will provide instructions. |
| | ☐ | Other: _____ |
| | h) | Steps must be taken to ensure the following: (Please check all the boxes below where steps have been or will be taken to ensure the following.) |
| | ☐ | Information is processed and maintained only for the purposes for which it was collected. |
| | ☐ | Information is reliable for its intended use. |
| | ☐ | Information is accurate. |
| | ☐ | Information is complete. |
| | ☐ | Information is current. |
| | | Please explain steps taken to ensure the above requirements are fulfilled. |

Gramm-Leach-Bliley Act

The USPS voluntarily complies with the Gramm-Leach-Bliley Act (GLB), Title V, which governs the treatment of personal information when certain financial services are provided. The GLB contains certain additional notice and choice requirements. Examples of financial services include banking activities or functions; wire or monetary transfers; printing, selling, or cashing checks; or providing USPS credit services. It does not include accepting payment by check or credit card issued by another entity.

| 2. | Does your program provide a financial service? |
|---|---|
| ☐ | No |
| ☐ | Yes (If "Yes," contact Privacy Office.) |

Children's Online Privacy Protection Act

The USPS voluntarily complies with the Children's Online Privacy Protection Act (COPPA), which requires notices and parental consent for certain practices if a website collects information from children under the age of 13.

| 3. | | If your program is online, do you know, or have reason to expect, that you are collecting personal information from children under the age of 13? |
|---|---|---|
| ☐ | | No |
| ☐ | | Yes (If "Yes," answer 3a.) |
| | a) | |
| | ☐ | Check that you have read and comply with the USPS privacy policy on usps.com related to collection of information from children, or contact Privacy Office. |

*FIG. 6*

Other Compliance

| | General | |
|---|---|---|
| 4. | Are contractors or business partners employed regarding your system? | |
| ☐ | No (If "No," skip to 5.) | |
| ☐ | Yes (If "Yes," answer 4a- 4b.) | |
| | a) Do contractors/partners have access to customer or employee information? | |
| | ☐ No | |
| | ☐ Yes | |
| | b) Do contractors/partners help design, build, or operate an externally-facing web site? | |
| | ☐ No | |
| | ☐ Yes | |
| | If "Yes" is checked in 4a or 4b above, list all prime contractors and partners, and contact Privacy Office to coordinate Law Department inclusion of appropriate privacy and confidentiality clauses in contract. | |
| 5. | If you would like to use customer information for another purpose than why it was collected (e.g., market another USPS product), customers must have been given a choice regarding that use. Please check the box that applies: | |
| ☐ | Will not use customer information for another purpose. | |
| ☐ | Yes, with the choice to Opt-in for other uses (customers must perform some action to show permission). | |
| ☐ | Other: _____ (Approval of the CPO is required.) | |
| 6. | Is the system using technologies, different from usps.com (see Question 11), that have the capability to identify, locate, and monitor individuals? | |
| ☐ | No | |
| ☐ | If "Yes," specify: _____ (Contact Privacy Office.) | |

*FIG. 7*

| | Online Applications |
|---|---|
| 7. | Does your application operate on usps.com? |
| ☐ | No (If "No," please state where your application resides.) |
| ☐ | Yes |
| 8. | Does your application require customers to register? |
| ☐ | No |
| ☐ | Yes |
| 9. | Does your application use the usps.com registration process? |
| ☐ | No (If "No," what registration process will your system use?) |
| ☐ | Yes (If "Yes," skip to 11.) |
| 10. | Will the registration process you use capture customer preference (as described in Question 5) on how the information is used? |
| ☐ | Yes |
| ☐ | No, other means will be used. (Approval of the CPO is required.) |
| ☐ | No, the system will not be using the data collected for another purpose. |
| 11. | Are any additional web analysis tools to be used beyond those used by usps.com? See usps.com privacy policy for authorized web analysis tools. For example, persistent cookies, web beacons, and other tools (except for session cookies) must be specifically authorized by the policy and CPO. |
| ☐ | No |
| ☐ | Yes (If "Yes," approval of the CPO is required.) |
| 12. | Will the website include links to external sites of any sort? |
| ☐ | No |
| ☐ | Yes (If "Yes," check and comply with the box below or contact Privacy Office.)<br>☐ Links comply with the affiliate program's standards and usps.com privacy policy relating to banners and links. |
| 13. | Will the website include ad banners of any sort? |
| ☐ | No |
| ☐ | Yes (If "Yes," check and comply with the box below or contact Privacy Office.)<br>☐ Banners comply with the usps.com standards and privacy policy relating to banners and links. |

*FIG. 8*

Data Types

What type of data is being collected, or who does the data apply to? Please check all that apply.

| | |
|---|---|
| ☐ | Customer (external, non-vendor customer as defined by Section 2, *Privacy Compliance*) |
| ☐ | USPS Employee |
| ☐ | USPS Employment Applicant |
| ☐ | Contractor, Vendor, or Business Partner |
| ☐ | Other: |

Data Sources

Please check all the data sources that apply.

| DATA SOURCES | |
|---|---|
| ☐ | Customer (external, non-vendor customer) |
| ☐ | USPS Employee |
| ☐ | USPS Employment Applicant |
| ☐ | Contractor, Vendor, or Business Partner |
| ☐ | Other USPS Data Source or Business Entity |
| ☐ | Other Government Data Source |
| ☐ | Consumer Reporting Agency |
| ☐ | Law Enforcement Agency |
| ☐ | Other: |

Data Access

Please check all the individuals and organizations that will have access.

| DATA ACCESS | |
|---|---|
| ☐ | Customer (external, non-vendor customer) |
| ☐ | USPS Employees |
| ☐ | USPS Managers |
| ☐ | Contractor, Vendor, or Business Partner |
| ☐ | Other: |

*FIG. 9*

Data Element Sensitivity Designation

Check all the data elements that you are collecting, transmitting, using, retrieving, and/or storing. If you collect any data elements that are not listed below, contact the CPO for guidance on entering those data elements in the appropriate table below.

PERSONAL DATA

| Sensitive | | | |
|---|---|---|---|
| ☐ Full Social Security Number | ☐ Fingerprints | ☐ Biometric Data | ☐ USPS Personnel Records |
| ☐ USPS Applicant or Employee Medical Information | ☐ Information compiled for law enforcement purposes | ☐ Change of Address with court ordered non-disclosure | ☐ Other: |

| Business-Controlled Sensitivity | | | |
|---|---|---|---|
| ☐ Home Street Address* | ☐ Home Phone Number* | ☐ Personal Cell Number* | ☐ Birth Date/Age* |
| ☐ Partial Social Security Number* | ☐ Driver's License Number | ☐ Credit Card Number (Full or Partial) | ☐ Race/National Origin* |
| ☐ Change of Home Address* | ☐ Other Account Number | ☐ Marital Status* | ☐ Family Information |
| ☐ Customer Obtained Demographic info.* | ☐ Externally Obtained Demographic Info.* | ☐ Buying Habits* | ☐ Web Navigation Habits* |
| ☐ Bill Payee Name | ☐ Bill Payee Address | ☐ Bill Payee Phone Number | ☐ Bill Payee Acct Number |
| ☐ Bank Routing Number | ☐ Bank Account Number | ☐ Personal Email Address | ☐ Personal Clubs and Affiliations* |
| ☐ Income/Assets: | ☐ Photographs | ☐ Other: | |

*Data element with a name or personal identifier is business-controlled sensitivity. Data element without a name or personal identifier is nonsensitive.

| Nonsensitive | | | |
|---|---|---|---|
| ☐ Name | ☐ City, State, and Zip (Home or Work) | ☐ Work Street Address | ☐ Work Phone Number |
| ☐ Work Fax Number | ☐ Work Cell Number | ☐ Work Pager Number | ☐ Work Email Address |
| ☐ Occupation | ☐ Job Description | ☐ USPS Salary | ☐ Professional Affiliations |
| ☐ ICQ/Chat Address | ☐ IP Address | ☐ Gender | ☐ USPS Employee ID Number |
| ☐ USPS Employee Title (position) | ☐ Other: | | |

*FIG. 10*

BUSINESS DATA

| Sensitive | | | |
|---|---|---|---|
| ☐ National Security Related Information | ☐ Communications Protected by Legal Privileges | ☐ USPS Restricted Financial/Trade Secrets/Proprietary | ☐ Other: |

| Business-Controlled Sensitivity | | |
|---|---|---|
| ☐ Not Publicly Available USPS Documents (withholdable under FOIA) | ☐ Not Publicly Available Information from Business Partners | ☐ Other |

| Non-Sensitive | | |
|---|---|---|
| ☐ Publicly Available USPS Information | ☐ Publicly Available Information from Business Partners | ☐ Other: |

Impact of Unauthorized Use

| 1. | Is the data subject to potential fraud or manipulation for financial gain? Check one. | |
|---|---|---|
| ☐ | Information has little or no potential to be used for financial gain through fraud or manipulation. | NS |
| ☐ | Information has moderate potential to be used for financial gain through fraud or manipulation. | BCS |
| ☐ | Information has significant potential to be used for financial gain through fraud or manipulation. | S |
| 2. | What is the impact on USPS of unauthorized disclosure or misuse of the information? Check one. (Includes revenue denied due to loss of business or market share, civil and legal penalties, impact to brand.) | |
| ☐ | Unauthorized disclosure or misuse of the information would result in little or no financial loss or negative impact to brand. | NS |
| ☐ | Unauthorized disclosure or misuse of the information would result in moderate financial loss or negative impact to brand. | BCS |
| ☐ | Unauthorized disclosure or misuse of the information would result in significant financial loss or negative impact to brand. | S |
| 3. | What is the impact on the individual on whom information is maintained if unauthorized disclosure or misuse of information occurs? Check one. | |
| ☐ | Results in little or no harm, embarrassment, inconvenience, or unfairness to the individual. | NS |
| ☐ | Results in moderate harm, embarrassment, inconvenience, or unfairness to the individual. | BCS |
| ☐ | Results in significant harm, embarrassment, inconvenience, or unfairness to the individual. | S |

Sensitivity Determination Summary

Based on an evaluation of the responses and the type of information being collected, this information resource is designated as (check one):

| ☐ Nonsensitive | ☐ Business-Controlled Sensitivity | ☐ Sensitive |
|---|---|---|

*FIG. 11*

Critical Impact of Information Resource Unavailability Determination

Check the box for each of the items below that best reflects the impact to the Postal Service if the information resource were to become unavailable.

| CUSTOMER OR EMPLOYEE WELL BEING (Life, safety, health, or financial status.) | | |
|---|---|---|
| ☐ | Little or no relationship to customer or employee well being. | NC |
| ☐ | Would result in moderate negative impact on the well being of customers or employees. | BCC |
| ☐ | Would result in a significant negative impact on the well being of customers or employees. | C |
| CUSTOMER OR MAIL SERVICE | | |
| ☐ | Little or no negative impact to customer or mail service. May result in inconvenience to customers but would not significantly impact customers or core business activities. | NC |
| ☐ | Would have a moderate negative impact on customers or impedes the movement of the mail. | BCC |
| ☐ | Would have a significant negative impact on customers or halts the movement of the mail. | C |
| PUBLIC CONFIDENCE, BRAND, OR IMAGE (Loss of customers, reduced competitiveness, or delay of new ventures and services.) | | |
| ☐ | Little or no relationship to public confidence, brand, or image. May result in a minimal or temporary impact on public confidence, brand, or image. | NC |
| ☐ | Would result in a moderate negative impact on public confidence, brand, or image. | BCC |
| ☐ | Would result in a significant negative impact on public confidence, brand, or image. | C |
| CASH FLOW (Outgoing cash such as accounts payable.) | | |
| ☐ | Little or no impact. May result in an inconvenience but would not significantly impact USPS financial activities related to outgoing cash (e.g., paying bills). | NC |
| ☐ | Would have a moderate negative impact on USPS financial activities related to outgoing cash. | BCC |
| ☐ | Would have a significant negative impact or prevent USPS financial activities related to outgoing cash. | C |
| REVENUE GENERATION (Incoming cash, e.g., accounts receivable, revenue denied due to loss of business or market share.) | | |
| ☐ | Little or no impact. May result in an inconvenience but would not significantly impact USPS financial activities related to incoming cash (e.g., receivables or loss of market share). | NC |
| ☐ | Would have a moderate negative impact on USPS financial activities related to incoming cash. | BCC |
| ☐ | Would have a significant negative impact or prevent USPS financial activities related to incoming cash. | C |

*FIG. 12*

| | | |
|---|---|---|
| ADDITIONAL EXPENSE RESULTING FROM CONDUCTING BUSINESS MANUALLY, OTHER LABOR-RELATED COSTS (Such as overtime, penalties, or legal liabilities.) | | |
| ☐ | Little or no additional expense or penalties. May result in additional costs, but significant additional expense and penalties would not be incurred. | NC |
| ☐ | Would result in moderate additional expenses, increased costs, or penalties. | BCC |
| ☐ | Would result in significant additional expenses, increased costs, or penalties. | C |
| FRAUD OR THEFT RESULTING FROM THE DIVERSION (OR CONCEALING) OF GOODS OR FUNDS BY INTERNAL OR EXTERNAL ENTITIES | | |
| ☐ | Little or no potential for fraud or diversion of goods. May result in a minor opportunity for fraud or diversion of goods. | NC |
| ☐ | Moderate potential for fraud or diversion of goods. | BCC |
| ☐ | Significant potential for fraud or diversion of goods. | C |
| AVAILABILITY DETERMINED BY REGULATORY REQUIREMENTS, CONTRACTUAL REQUIREMENTS, OR USPS STANDARDS | | |
| ☐ | Little or no impact on availability. Requirements or standards are either non-existent or subject to exemption. | NC |
| ☐ | Moderate impact on availability could violate requirements or standards. | BCC |
| ☐ | Significant impact on availability would violate requirements or standards. | C |
| AVAILABILITY AFFECTS REAL-TIME DECISION MAKING | | |
| ☐ | Little or no impact on real-time decision making. Information resource provides no or insignificant management and control information for real-time decision making. | NC |
| ☐ | Moderate impact could affect real-time decision making. | BCC |
| ☐ | Significant impact would affect real-time decision making. | C |
| PROVIDES REQUIRED INPUT OR REQUIRED SUPPORT FOR AN INFORMATION RESOURCE | | |
| ☐ | Provides no required input or required support to a critical or business-controlled criticality information resource or provides required input or required support for a noncritical information resource. | NC |
| ☐ | Provides required input or support for a business-controlled criticality information resource and there are no other alternatives available. | BCC |
| ☐ | Provides required input or support for a critical information resource and there are no other alternatives available. | C |

Criticality Determination Summary

Based on an evaluation of the responses, this information resource is designated as (check one):

| | | |
|---|---|---|
| ☐ Noncritical | ☐ Business-Controlled Criticality | ☐ Critical |

Note: If the information resource is designated as critical or business-controlled criticality, continue with Section 6, *Determination of Recovery Time Objective (RTO)*. Otherwise, go directly to Section 7, *Acceptance of Responsibility and Acknowledgement of Accountability.*

*FIG. 13*

DETERMINATION OF RECOVERY TIME OBJECTIVE (RTO)

Completion of this section of the BIA is only required for information resources designated as critical or business-controlled criticality. This section provides a process for determining an appropriate recovery time objective (RTO) for an information resource. RTO is defined as the maximum length of time an information resource can be unavailable before the Postal Service begins to experience significant operational or business services losses.

| IMPACT DEFINITIONS | | |
|---|---|---|
| N | No or Negligible Impact | Has no or negligible impact on USPS operational or financial activities or the well being (life, safety, health, or financial status) of employees or customers. |
| M | Moderate Impact | Would have a moderate negative impact on USPS operational or financial activities or the well being of employees or customers. |
| H | High Impact | Would have a significant negative impact on USPS operational or financial activities or the well being of employees or customers. |

Identification of Impacts Over Time

To calculate the RTO for your information resource, use the legend above and do the following:

a) For each Impact Category, determine the degree of impact (N, M, or H) if the information resource were to become unavailable. Assume that the system becomes unavailable during your busiest processing cycle (e.g., end of quarter, holiday, etc.).
b) Enter N, M, or H for each category in each time interval column.

| Impact Categories | 1 Hr | 8 Hrs | 24 Hrs | 72 Hrs | 1 Week | 1 Month+ |
|---|---|---|---|---|---|---|
| Affects Public Confidence, Brand, Image (Loss of Customers or Competitiveness) | | | | | | |
| Affects the Well Being of Customers or Employees | | | | | | |
| Affects Cash Flow (Outgoing Cash such as Accounts Payable) | | | | | | |
| Affects Revenue Generation (Incoming Cash such as Accounts Receivable) | | | | | | |
| Results in Additional Expenses (such as overtime, penalties, liabilities, etc.) | | | | | | |
| Fraud or Theft Resulting from Unauthorized Use or Unavailability of the Information Resource | | | | | | | c) Total the number of "Moderates" and "Highs" from the above table and enter the totals in the table below.

| Impact Level Totals for | 1 Hr | 8 Hrs | 24 Hrs | 72 Hrs | 1 Week | 1 Month + |
|---|---|---|---|---|---|---|
| Moderate | | | | | | |
| High | | | | | | |

*FIG. 14*

Determine Internal or External Dependencies

In the table below, identify dependent information resources that provide input to or receive support from the information resource. A system is dependent if it CANNOT function without the input of the other system. Information resources that are dependent upon one another must have plans with recovery strategies based on the same RTO. (Continue the list on a separate page if necessary.)

Note: Go to the Enterprise Information Repository (EIR) at http://eir/ to identify the RTO for an information resource.

|   | Name of the Information Resource | External or Internal (E or I) | EIR Number | Provides Input to Info. Resource (Y or N) | Receives Support from the Info. Resource (Y or N) | RTO (If Known) | Criticality (C, BCC, or NC) |
|---|---|---|---|---|---|---|---|
| 1. | | | | | | | |
| 2. | | | | | | | |
| 3. | | | | | | | |
| 4. | | | | | | | |

Recovery Time Objective Calculation

Complete Steps 1 – 6, below, to determine RTO.

| Step | If you ... | Then ... | Time Interval |
|---|---|---|---|
| 1. | Recorded any High impacts in Section 6.1 | Enter the lowest time interval for recorded Highs in the *Time Interval* column (e.g., 1 hr., 8 hrs., etc.). | |
|  | Did not record any Highs | Skip to step 2. | |
| 2. | Recorded any Moderates in Section 6.1 | Add up the number of Moderates in each time interval. Enter the time interval with the highest frequency of Moderates in the *Time Interval* column. <br><br> If ... More than one time interval has the same frequency of Moderates — Then ... Enter the time in the *Time Interval* column that best matches your estimate of RTO | |
| 3. | Recorded no Highs or Moderates in any category | Enter one month in the *Time Interval* column. | |
| 4. | Recorded any dependencies and RTOs in Section 6.2 | Enter the lowest RTO time interval indicated in 6.2 in the *Time Interval* column. | |
| 5. | Recorded any time intervals in Steps 1, 2, and 4 | Enter the lowest of the time intervals in the *Time Interval* column. | Calculated RTO |
| 6. | Select the RTO your organization will use to design your recovery strategy | Record the Selected RTO in the *Time Interval* column and explain briefly under Comments why you selected a higher or lower RTO than the Calculated RTO in the space below (budget, risk avoidance, etc.). | Selected RTO |
| Comments: | | | |

*FIG. 15*

ACCEPTANCE OF RESPONSIBILITY AND ACKNOWLEDGEMENT OF ACCOUNTABILITY

I am responsible for implementing and funding security controls that will satisfy compliance with Information Security Assurance (ISA) outlined in Handbook AS-805, *Information Security*, and Handbook AS-805-A, *Information Security Assurance*. I understand this ISA compliance may affect the development time and cost of this project and must be planned for accordingly.

I will ensure that Postal Service information security policies, guidelines, and procedures are followed in system life cycle activities, including procurement, development, integration, and operation.

| COMMENTS: |
|---|
|  |
|  |
|  |
|  |
| Executive Sponsor or Designee     Title     Date (MM/DD/YYYY) |

*FIG. 16*

GENERAL INFORMATION RESOURCE DATA
Brief System Description

| |
|---|
| Purpose: |
| Applications: |
| Operating System: |
| Data or Database: |
| Hardware: |
| Network: |
| Communications: |
| Security Software: |
| Other: |
| Projected Production Date: |

Development and Deployment Characteristics

| | Question | Yes | No |
|---|---|---|---|
| 1. | Will the information resource be publicly accessible? | | |
| 2. | Will the information resource be developed offsite primarily by non-Postal Service personnel? | | |
| 3. | Will the information resource be hosted at a non-Postal Service site? | | |
| 4. | Will the information resource be managed primarily by non-Postal Service personnel? | | |
| 5. | Will the information resource have high visibility or high impact if there is security incident? | | |
| 6. | Will the information resource be located in a Postal Service controlled access area? | | |
| 7. | Is a COTS product a significant feature or portion of the information resource? | | |
| 8. | Does the COTS product contain custom programming or scripts? | | |
| 9. | Is the information resource an externally-facing application containing custom programming (HTML, XML, Java, Javascript, CGI, ActiveX, etc.)? | | |
| 10. | Does the information resource transmit information between a Postal Service network and a public or other non-Postal Service network, or between a Postal Service demilitarized zone (DMZ) and a public network or non-Postal Service network? | | |
| 11. | Will the information be stored in a secure location? | | |
| 12. | If stored in a secure location, is access controlled? | | |

*FIG. 17a*

| 13. | Could unrestricted access to hardcopy information and storage media result in the disclosure of business-controlled sensitivity information? | | |
|---|---|---|---|
| 14. | Could the aggregation of multiple business-controlled sensitivity information elements by unauthorized persons result in the violation of an individual's privacy or jeopardize Postal Service operations? | | |
| 15. | Could unrestricted access to computer screens result in the disclosure of business-controlled sensitivity information? | | |
| 16. | Will access to this information increase the opportunity for theft, collusion, fraud, blackmail, or prevent the timely performance of Postal Service operations? | | |
| 17. | Is there an opportunity for disclosure, unavailability, modification or damage to the application, or prevention of timely performance of Postal Service operations if operational training is not provided? | | |
| 18. | Does application contain Active Content or CGI code? | | |
| 19. | Is the data collected, stored, analyzed, or maintained by this information resource available in another form or from another source? | | |
| 20. | Would the unavailability of this information resource prevent the timely performance of Postal Service operations? | | |

*FIG. 17b*

DECLARATION OF INFORMATION SECURITY REQUIREMENTS

Independent Processes

| Determination of the Need for Independent Processes | Yes | No |
|---|---|---|
| Has the VP CTO, Manager Corporate Information Security Office (CISO), or Vice-President of the functional business area designated the information resource as requiring an: | | |
| 1. Independent risk assessment? | | |
| 2. Independent code review? | | |
| 3. Independent validation of security testing? | | |
| 4. Independent penetration testing and vulnerability scans? | | |

*FIG. 18*

Information Security Requirements To Be Implemented

*LEGEND: BAS: Baseline, MAN: Mandatory, REC: Recommended Discretionary, ACC: Accepted Discretionary*

| REQ. NO. | INFORMATION SECURITY REQUIREMENT (HANDBOOK AS-805, INFORMATION SECURITY REFERENCE) | BAS | MAN | REC | ACC |
|---|---|---|---|---|---|
| 1-1 | Identify application, business requirements, and related roles and responsibilities (1-1) | X | | | |
| 3-4 | Label hardcopy and storage media as "restricted information" (3-5.1) | | | | |
| 3-5 | Add "restricted information" to computer screen display (3-5.1) | | | | |
| 3-7 | Implement appropriate disposal and destruction procedures (3-5.6); eradicate information on hardware and electronic media prior to re-use by another program or being released for maintenance (3-5.6.2, 3-5.5.4) | X | | | |
| 3-9 | Release information on clean, virus-free media (3-5.5.3) | X | | | |
| 4-1 | Complete an application risk assessment or an abbreviated application risk assessment (4-1, 4-4.1) | | | | |
| 4-2 | Conduct an independent risk assessment (4-5) | | | | |
| 4-3 | Complete a site security review (4-6.1) | | | | |
| 5-2 | Evaluate the use of cookies and other user tracking mechanisms (5-9.3.1, 5-9.3.2) | X | | | |
| 5-5 | Notify customers before transfer to an external site not under Postal Service control (5-9.3.3) | X | | | |
| 6-1 | Request clearance or background screening for applicable personnel (6-5) | | | | |
| 6-2 | Implement appropriate separation of duties and responsibilities (6-3.1) | | | | |
| 6-4 | Implement application operational security training (6-6.3) | | | | |
| 7-2 | Locate application in a controlled area (room level security) (7-3.1.1, 7-3.1.2) | | | | |
| 7-13 | Protect information resources being removed from a secure environment and sensitive and business-controlled sensitivity information residing on them (7-3.2) | | | | |
| 8-1 | Develop and maintain an application security plan or abbreviated application security plan (8-6.2.8) | | | | |
| 8-2 | Develop and execute a security test and evaluation [ST&E] plan (8-6.3.1, 8-6.3.6) | | | | |
| 8-4 | Provide high-level architectural diagrams (8-6.2.1); submit documentation for secure enclave assessment (11-5.8) | X | | | |
| 8-7 | Include information security in service level agreements [SLA] (internal and external systems) and trading partner agreements (external systems only) (8-6.2.14) | X | | | |
| 8-9 | Conduct independent validation of security testing (8-6.3.8) | | | | |
| 8-10 | Conduct independent security code review (8-6.3.5) | | | | |
| 8-11 | Conduct independent penetration tests and vulnerability scans (8-6.3.7) | | | | |

*FIG. 19*

| REQ. NO. | INFORMATION SECURITY REQUIREMENT (HANDBOOK AS-805, INFORMATION SECURITY REFERENCE) | BAS | MAN | REC | ACC |
|---|---|---|---|---|---|
| 8-12 | Comply with Postal Service testing environment restriction policies (8-3.6) | X | | | |
| 8-15 | Conduct security code review (8-6.3.3) | | | | |
| 9-1 | Protect data from modification or deletion by unauthorized users (9-9.2) | X | | | |
| 9-2 | Uniquely identify and authenticate each user (9-6, 9-7); comply with authentication requirements established in Postal Service policies (9-7) | X | | | |
| 9-3 | Restrict supervisory and administrative privileges (9-5.3.2) | X | | | |
| 9-4 | Implement session management including timeouts or screen savers where the platform permits (9-7.9) | X | | | |
| 9-6 | Implement logical access security (9-11) | | | | |
| 9-7 | Authorize access based on need-to-know and least privilege (9-4.1.2, 9-4.1.4) | X | | | |
| 9-8 | Encrypt appropriate information transmitted over untrusted networks (9-8.2.1, 3-5.4.1) based on Postal Service encryption and key recovery policies (9-8.2, 5-6.3) | | | | |
| 9-9 | Encrypt information stored in a non-secure location (9-8.2.2, 3-5.4.2) based on Postal Service encryption and key recovery policies (9-8.2, 5-6.3) | | | | |
| 9-10 | Encrypt information stored in a secure location (onsite and offsite) (9-8.2.2, 3-5.4.2) based on Postal Service encryption and key recovery policies (9-8.2, 5-6.3) | | | | |
| 9-12 | Implement application level auditing and logging (9-12) | | | | |
| 10-1 | Implement virus protection (10-7) | X | | | |
| 10-3 | Implement application on a server hardened to Postal Service standards (10-5.3.1) | X | | | |
| 10-5 | Evaluate Active content or CGI code (10-7.2.2) | | | | |
| 10-7 | Implement appropriate database security (10-6.6.2) | X | | | |
| 11-6 | Acquire approval in advance for modem access to and from Postal Service networks and implement information resource protection measures in accordance with Postal Service remote access security policies (11-12.3) | X | | | |
| 12-1 | Develop and test an application disaster recovery plan [ADRP] (12-7.1, 12-9) | | | | |
| 12-4 | Implement backup and recovery procedures (12-5) | X | | | |
| 12-5 | Implement off-site storage of backup media or off-site backups (12-5.5) | | | | |
| 12-6 | Utilize secondary storage device (network attached storage, RAID storage); implement redundancy (redundant components, servers, infrastructures); implement fault-tolerant systems; implement a mirrored site (12-7.3); and maintain an inventory of backup media offsite (12-5.4) | | | | |
| 13-1 | Report incidents in accordance with Postal Service policies (13-4.1) | X | | | |
| 14-1 | Implement authorized warning banner (14-5.5) | X | | | |

*FIG. 20*

METHODS AND SYSTEMS FOR DETERMINING SECURITY REQUIREMENTS FOR AN INFORMATION RESOURCE

RELATED APPLICATION

Under provisions of 35 U.S.C. §119(e), this Application claims the benefit of U.S. Provisional Application No. 60/471,970, filed May 20, 2003, which is incorporated herein by reference.

BACKGROUND

I. Technical Field

The present invention generally relates to determining security requirements to insure compliance with privacy requirements. More particularly, embodiments of the present invention relate to determining security requirements for an information resource based on a sensitivity level derived from privacy requirements of information maintained by the information resource.

II. Background Information

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving packages and other items.

The USPS processes and delivers billions of items each year. In this large-scale item delivery system, information resources are used extensively. Consequently, determining security requirements for information resources is desired. Great inefficiencies are created in conventional security requirements processes because, for example, they do not consider many critical elements. Accordingly, determining security requirements remains an elusive goal. Thus, there remains a need for efficiently determining security requirements. In addition, there remains a need for efficiently determining security requirements for an information resource.

SUMMARY

Consistent with embodiments of the present invention, systems and methods are disclosed for determining security requirements for an information resource.

In accordance with one embodiment, a method for determining security requirements for an information resource comprises determining a sensitivity level associated with the information resource, determining a criticality level associated with the information resource, and determining the security requirements for the information resource based on at least one of the sensitivity level and the criticality level. In this embodiment, the sensitivity level is derived from privacy requirements of information maintained by the information resource. For example, the sensitivity level and resulting security requirements may be based on a need to meet privacy requirements by protecting confidentiality or integrity of the information resource.

In accordance with another embodiment, a system for determining security requirements for an information resource comprises a memory storage for maintaining a database and a processing unit coupled to the memory storage, wherein the processing unit is operative to determine a sensitivity level associated with the information resource, determine a criticality level associated with the information resource, and determine the security requirements for the information resource based on at least one of the sensitivity level and the criticality level.

In accordance with yet another embodiment, a computer-readable medium which stores a set of instructions which when executed performs a method for determining security requirements for an information resource, the method executed by the set of instructions comprises determining a sensitivity level associated with the information resource, determining a criticality level associated with the information resource, and determining the security requirements for the information resource based on at least one of the sensitivity level and the criticality level.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIG. 4 through FIG. 20 illustrate exemplary data entry forms consistent with an embodiment of the present invention.

DETAILED DESCRIPTION

Figure 1:
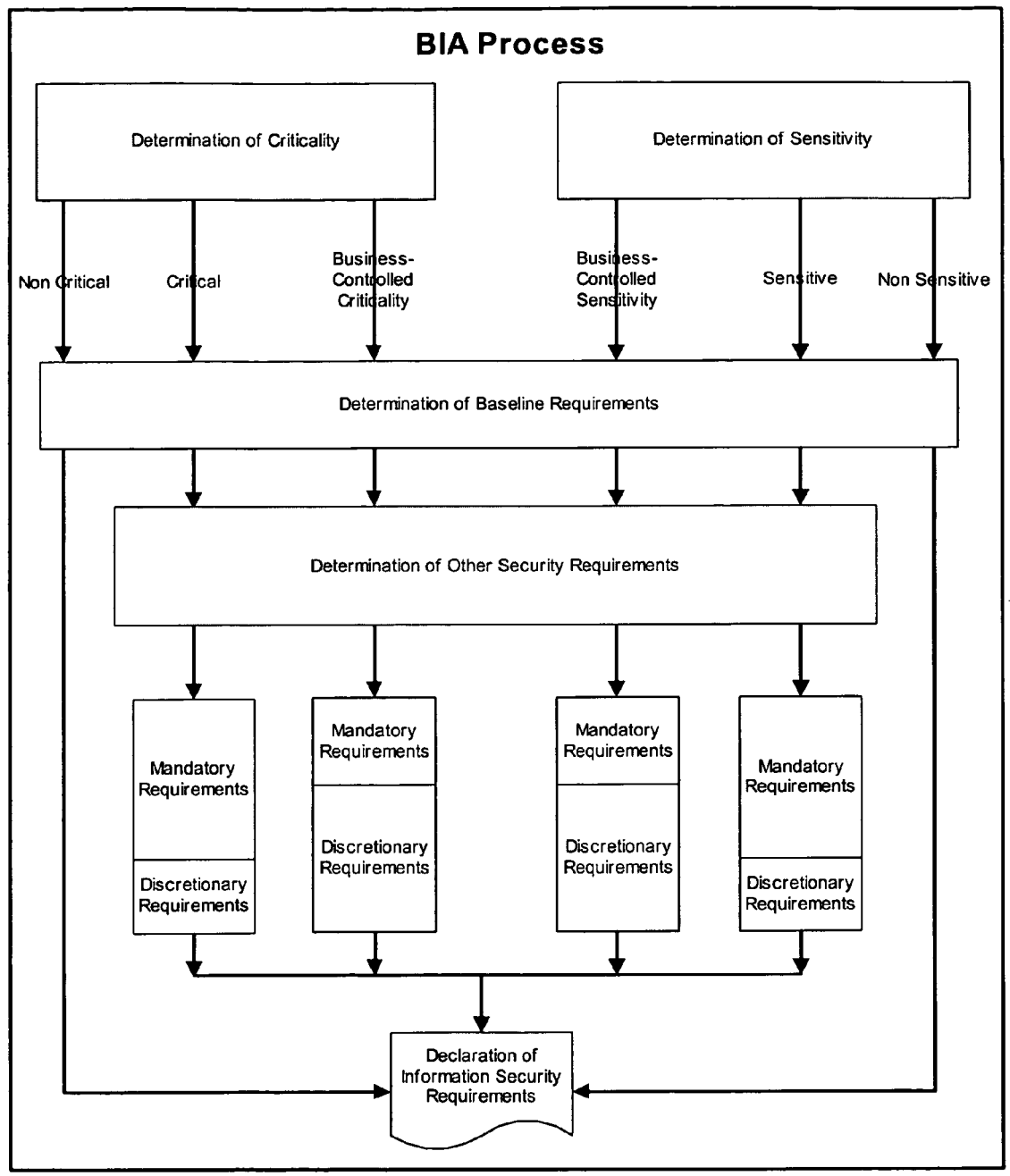
FIG. 1 is a block diagram of a system for determining security requirements for an information resource consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with embodiments of the present invention may determine security requirements for an information resource associated with an enterprise such as, for example, the USPS. FIG. 1 shows an exemplary system for determining security requirements that may include performing a business impact assessment (BIA). Performing the BIA may include collecting information about the information resource and determining privacy requirements, a sensitivity level, a criticality level, and a recovery time objective.

In addition, the BIA may include identifying appropriate security requirements in an effort to protect the information resource based on its sensitivity and criticality levels. The BIA may encompass multiple business processes or focus on one particular aspect of the enterprise. Also, the BIA may be completed for all information resources, regardless of whether they are developed in-house, out-sourced, or hosted in non-enterprise related facilities.

The aforementioned sensitivity level may indicate the need to protect the confidentiality and integrity of information. As shown in FIG. 1, the sensitivity levels may include, but are not limited to, sensitive, business-controlled sensitivity, and non-sensitive. Moreover, the aforementioned criticality level may indicate the need for continuous availability and integrity of the information. As shown in FIG. 1, the criticality level may include, but are not limited to, critical, business-controlled criticality, and non-critical.

The BIA may ensure that programs involving customer or employee information, or technologies that can be used for monitoring purposes, adhere to enterprise related privacy requirements. Privacy requirements may be based, for example, on applicable privacy laws, such as the Federal Privacy Act, as well as privacy policies that the enterprise may adopt.

Moreover, the BIA may determine the information security requirements for information resources. The security requirements associated with an information resource's protection may be categorized, for example, as baseline, mandatory, discretionary, and discretionary treated as mandatory. The security requirements may vary with the information resource's sensitivity and criticality designation and the responses to data received from a user.

Baseline security requirements may be requirements that must be implemented by an enterprise's information resources to protect the enterprise's infrastructure. For example, these requirements may be noted with an "X" in a box in the baseline (BAS) column of the data entry forms shown in FIGS. 19-20, as described below. Furthermore, mandatory security requirements may be requirements that must be implemented based on the sensitivity and criticality designation of the enterprise's information resources. For example, these requirements may be noted with an "X" in a box in the mandatory (MAN) column of the data entry forms of FIGS. 19-20, as described below. Discretionary security requirements, for example, may be marked with an "X" in a box in the accepted discretionary (ACC) column in FIGS. 19-20, also as described below.

In some instances, there are security requirements that may have been treated as discretionary, but, for example, based on responses to selected questions shown in the forms of FIGS. 17 and 17a (general information resource data) and FIG. 18 (independent processes), these security requirements may be treated as mandatory. When any of these questions are answered "Yes", the requirement may be noted with an "X" in the MAN column in FIGS. 19-20. Additional security requirements may be required due to changes in technology, changes in the enterprise's mission, or the discovery of new vulnerabilities in applications and infrastructure during an information resource risk assessment process.

For non-sensitive and non-critical information resources, for example, appropriate controls may be implemented to satisfy the baseline security requirements. For sensitive, business-controlled sensitivity, critical, and business-controlled criticality information resources, for example, the appropriate controls may be implemented to satisfy the baseline security requirements, the mandatory security requirements, and discretionary security requirements. The BIA may be performed whenever a new information resource is being developed and may be updated periodically (every three years or whenever a significant change is made to the information resource, for example.)

BIA process benefits may include: i) a structured and cost effective methodology that yields consistent and repeatable results; ii) clear, succinct guidelines to ensure privacy compliance at an appropriate phase of the business planning process; iii) determination of appropriate information resource sensitivity and criticality designation; iv) determination of information resource dependencies and an appropriate recovery time objective (RTO); v) the focusing of security requirements on information resource sensitivity, criticality, function, and environment; vi) a risk-based approach that empowers business owners to implement controls to satisfy the discretionary requirements where the business risk justifies such practices; and vii) early determination of security requirements that can be integrated into plans, costs, design, development, and testing of information resources.

An embodiment consistent with the invention may comprise a system for determining security requirements for an information resource. The system may comprise a memory storage for maintaining a database and a processing unit coupled to the memory storage. The processing unit may be operative to determine a sensitivity level associated with the information resource. Furthermore, the processing unit may be operative to determine a criticality level associated with the information resource. In addition, the processing unit may be operative to determine the security requirements for the information resource based on at least one of the sensitivity level and the criticality level. Moreover, the processing unit may be operative to determine a recovery time objective for the information resource and to insure that information used in determining the security requirements adheres to privacy requirements.

Figure 2:
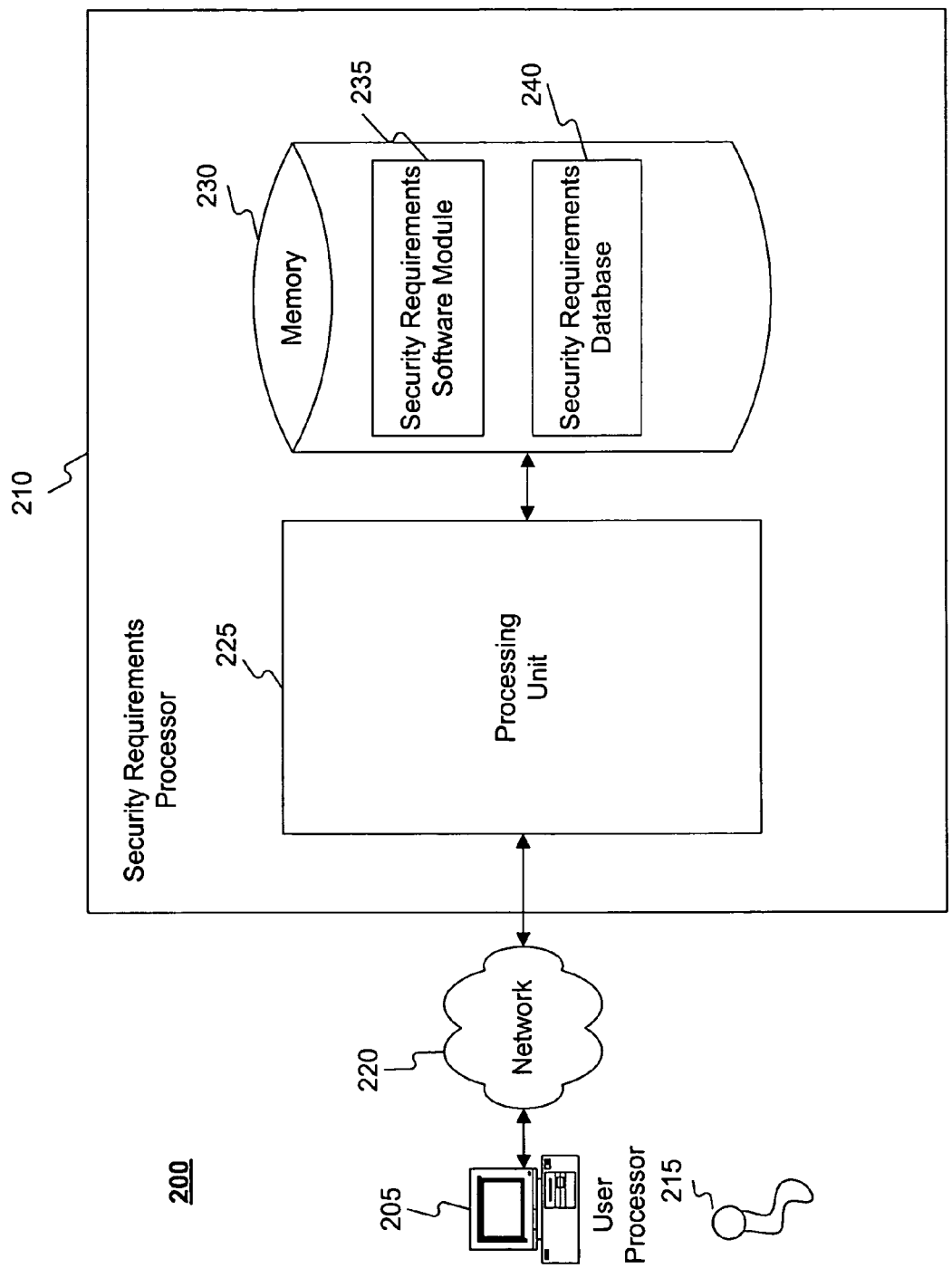
FIG. 2 is a block diagram of a security requirements system consistent with an embodiment of the present invention.

Consistent with an embodiment of the present invention, the aforementioned memory, processing unit, and other components may be implemented in a security requirements system, such as an exemplary security requirements system 200 of FIG. 2. Any suitable combination of hardware, software and/or firmware may be used to implement the memory, processing unit, or other components. By way of example, the memory, processing unit, or other components may be implemented with any of a user processor 205 or security requirements processor 210, in combination in system 200. The aforementioned system and processors are exemplary and other systems and processors may comprise the aforementioned memory, processing unit, or other components, consistent with embodiments of the present invention.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

By way of a non-limiting example, FIG. 2 illustrates system 200 in which the features and principles of the present invention may be implemented. As illustrated in the block diagram of FIG. 2, system 200 may include user processor 205, security requirements processor 210, a user 215, and a network 220. User 215 may be an individual, for example, desiring to determine security requirements for an information resource using user processor 210. User 215 may also be an organization, enterprise, or any other entity having such desires.

Security requirements processor 210 may include a processing unit 225 and a memory 230. Memory 230 may include a security requirements software module 235 and a security requirements database 240. For example, security requirements software module 235, executed on processing unit 225, may access security requirements database 240 and implement processes for determining security requirements for the information resource such as the exemplary method described below with respect to FIG. 3.

User processor 205 or security requirements processor 210 ("the processors") included in system 200 may be implemented using a personal computer, network computer, mainframe, or other similar microcomputer-based workstation. The processors may though comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 220 may comprise, for example, a local area network (LAN) or a wide area network (WAN). Such networking environments are commonplace in offices, enterprise-wide computer networks, intranets, and the Internet, and are known by those skilled in the art. When a LAN is used as network 220, a network interface located at any of the processors may be used to interconnect any of the processors. When network 220 is implemented in a WAN networking environment, such as the Internet, the processors may typically include an internal or external modem (not shown) or other means for establishing communications over the WAN. Further, in utilizing network 220, data sent over network 220 may be encrypted to insure data security by using known encryption/decryption techniques.

In addition to utilizing a wire line communications system as network 220, a wireless communications system, or a combination of wire line and wireless may be utilized as network 220 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 200 may also transmit data by methods and processes other than, or in combination with, network 220. These methods and processes may include, but are not limited to, transferring data via, diskette, CD ROM, facsimile, flash memory sticks, conventional mail, an interactive voice response system (IVR), or via voice over a publicly switched telephone network.

Figure 3:
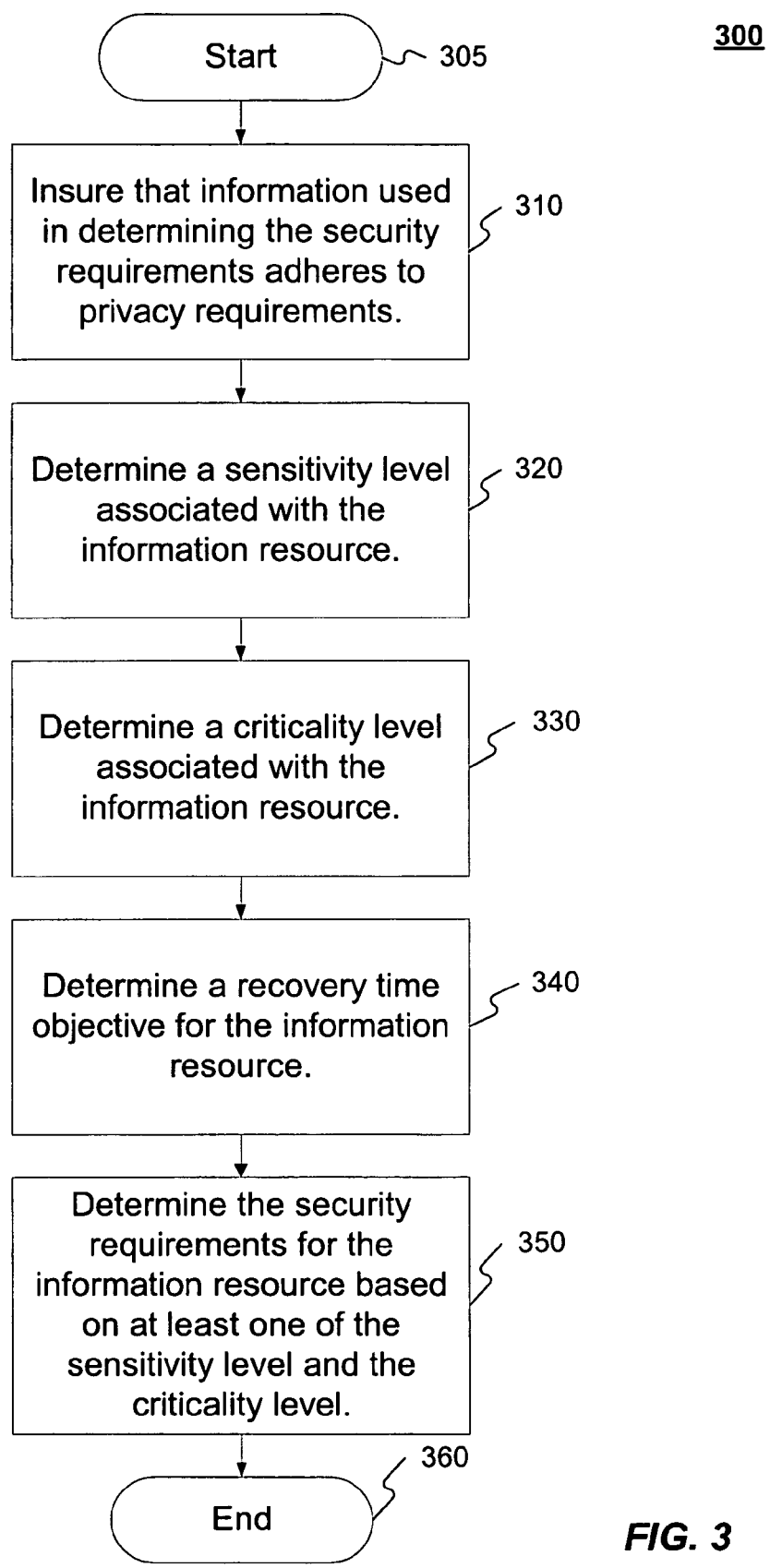
FIG. 3 is a flow chart of an exemplary method for determining security requirements consistent with an embodiment of the present invention.

FIG. 3 is a flow chart setting forth the general stages involved in an exemplary method 300 consistent with the invention for determining security requirements for an information resource using system 200 of FIG. 2. Exemplary ways to implement the stages of exemplary method 300 will be described in greater detail below. Exemplary method 300 may begin at starting block 305 and proceed to stage 310 where processor 210 may insure that information used in determining the security requirements adheres to privacy requirements. For example, user 215 may enter data into processor 210 over network 220. Processor 210 may present screens to user 215, viewing user processor 205, in which user 215 may enter data. The screens may include a project identification screen as shown in FIG. 4, which receives entry of project Identification information, contact information, and development and production information. Furthermore, system 200 may receive from user 215 data regarding privacy data in screens shown in FIG. 5 through FIG. 9. Based on data entered in FIG. 5 through FIG. 9, for example, processor 210 may insure that information used in determining the security requirements adheres to privacy requirements.

From stage 310, where processor 210 insures that the information used in determining the security requirements adheres to privacy requirements, exemplary method 300 may advance to stage 320 where processor 210 may determine a sensitivity level associated with the information resource. For example, processor 210 may receive data from user 215 over network 220. Processor 210 may present screens to user 215, viewing user processor 205, in which user 215 may enter data. The screens may include sensitivity data screens as shown in FIG. 10 and FIG. 11. For example, if one or more of the items in FIG. 10 and FIG. 11 are designated by user 215 to be sensitive, processor 210 may determine a sensitivity level of "sensitive" and may indicate as much by marking the corresponding box at the bottom of FIG. 11. If none of the items in FIG. 10 and FIG. 11 are designated by user 215 to be sensitive, but one or more are designated as business-controlled sensitivity, processor 210 may determine a sensitivity level of "business-controlled sensitivity" and may indicate as much by marking the corresponding box at the bottom of FIG. 11. Furthermore, if all of the items in FIG. 10 and FIG. 11 are designated by user 215 to be non-sensitive, processor 210 may determine a sensitivity level of "non-sensitive" and may indicate as much by marking the corresponding box at the bottom of FIG. 11.

Once processor 210 determines the sensitivity level associated with the information resource in stage 320, exemplary method 300 may continue to stage 330 where processor 210 may determine a criticality level associated with the information resource. For example, user 215 may enter data into processor 210 over network 220. Processor 210 may present screens to user 215, viewing user processor 205, in which user 215 may enter data. The screens may include criticality data screens as shown in FIG. 12 and FIG. 13. For example, if one or more of the items in FIG. 12 and FIG. 13 are designated by user 215 to be critical, processor 210 may determine a criticality level of "critical" and may indicate as much by marking the corresponding box at the bottom of FIG. 13. If none of the items in FIG. 12 and FIG. 13 are designated by user 215 to be critical, but one or more are designated as business-controlled criticality, processor 210 may determine a criticality level of "business-controlled criticality" and may indicate as much by marking the corresponding box at the bottom of FIG. 13. Furthermore, if all of the items in FIG. 12 and FIG. 13 are designated by user 215 to be non-critical, processor 210 may determine a criticality level of "non-critical" and may indicate as much by marking the corresponding box at the bottom of FIG. 13.

After processor 210 determines a criticality level associated with the information resource in stage 330, exemplary method 300 may proceed to stage 340 where processor 210 may determine a recovery time objective for the information resource. For example, user 215 may enter data into processor 210 over network 220. Processor 210 may present screens to user 215, viewing user processor 205, in which user 215 may enter data. The screens may include recovery time objective (RTO) data screens as shown in FIG. 14 and FIG. 15. User 215 may enter data in identification of impacts over time section of FIG. 14 by determining the impacts associated with the various time intervals for each impact category. These values may be used to determine the recovery time objective. In each box, user 215 may enter an "N," "M," or "H" to reflect the impact to the enterprise (Negligible, Moderate, or High) if the information resources were to be unavailable for each of the indicated time intervals, using the impact definitions provided. For any information resource with a time to impact greater than 1 week, user 215 may mark the "1-month+" column. Furthermore, processor 210 may complete the identification of impacts over time section (c) by tallying the "M" and "H" responses recorded in section (b) and noting the count in the appropriate time interval.

Next, user 215 may complete the determine internal and external dependencies section of FIG. 15 by entering the dependent information resources that provide required support to, or receive required support from, the information source. Dependent information resources may be ones that cannot function without support of another. Information resources that are dependent on input support from another resource may have plans with recovery strategies based on the same RTO. If not, an executive sponsor may negotiate changing the RTO of the information resource(s) providing or receiving support as appropriate. User 215 may also complete the recovery time objective calculation section of FIG. 15 by following steps 1 through 6 shown in this section of FIG. 15.

From stage 340, where processor 210 determines the recovery time objective for the information resource, exemplary method 300 may advance to stage 350 where processor 210 may determine the security requirements for the information resource based on at least one of the sensitivity level and the criticality level. For example, for information resources with a "non-sensitive" sensitivity level and a "non-critical" criticality level, appropriate controls may be implemented to satisfy the baseline security requirements. For information resources with a "sensitive" or a "business-controlled sensitivity" sensitivity level and a "critical" or "business-controlled criticality" criticality level, the appropriate controls may be implemented to satisfy the baseline security requirements, the mandatory security requirements, and discretionary security requirements.

User 215 may complete an acceptance of responsibility and acknowledgement of accountability screen as shown in FIG. 16 and a general information resource data screen as shown in FIG. 17a and FIG. 17b. The responses to the FIG. 17a and FIG. 17b questions may be used to determine security requirements and whether independent processes (risk assessment, code review, validation of security testing, penetration testing, and vulnerability scans) may be recommended.

Next, user 215 may complete a declaration of information security requirements screen as shown in FIG. 18 by checking the appropriate boxes relative to the need for independent processes. Independent processes may be evaluations conducted by independent personnel, contractors, or vendors for the purpose of applying rigorous evaluation standards to information resources. An independent process may be conducted by an internal or external organization that is separate and distinct from those responsible for the development and operation of the application and strictly adheres to the separation of duties policy.

User 215 may then complete information security requirements to be implemented screens as shown in FIG. 19 through FIG. 20. The baseline security requirements for all information resources may be pre-marked in the BAS column by processor 210. The mandatory and recommended discretionary security requirements may be marked in the MAN and REC columns respectively. A portfolio manager or designee may decide which of the recommended discretionary security requirements will be implemented and may indicate acceptance by placing an X in the appropriate box in the ACC column.

For example, processor 210 may determine that the security requirements, based on a non-sensitive sensitivity level and a non-critical criticality level, must implement controls that will satisfy the baseline security requirements and any mandatory security requirements identified in: i) question 9 of FIG. 17a (development and deployment characteristics) or in ii) FIG. 18 (independent processes.) Furthermore, processor 210 may determine that the security requirements, based on business-controlled, sensitive and critical information resources, must implement controls that will satisfy the baseline security requirements, the mandatory security requirements, and the accepted discretionary security requirements. Once processor 210 determines the security requirements for the information resource based on at least one of the sensitivity level and the criticality level in stage 350, exemplary method 300 may then end at stage 360.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for determining security requirements for an information resource, using a computer system, the method comprising:

determining, by the computer system, a privacy policy governing information maintained by the information resource;

assigning, by the computer system, sensitivity levels to individual data elements based on user input;

determining, by the computer system, a sensitivity level for the information resource based on the sensitivity levels of the individual data elements, the determined sensitivity level of the information resource corresponding to the highest sensitivity level of the individual data elements;

assigning, by the computer system, the determined highest sensitivity level to the information resource to implement the privacy policy;

determining, by the computer system, a criticality level associated with the information resource, the criticality level corresponding to an impact if the information resource were to become unavailable; and determining, by the computer system, security requirements for the information resource based on at least one of the determined sensitivity level and the criticality level to enforce the privacy policy governing the information maintained by the information resource;

wherein the security requirements include at least one of baseline security requirements, mandatory security requirements, discretionary security requirements, and discretionary security requirements treated as mandatory; and wherein the baseline security requirements comprise security requirements to protect infrastructure.

2. The method of claim 1, further comprising determining a recovery time objective for the information resource.

3. The method of claim 1, further comprising ensuring, by the computer system, that information used in determining the security requirements adheres to privacy requirements.

4. The method of claim 1, wherein the sensitivity level further comprises one of sensitive, business-controlled sensitivity, and non-sensitive.

5. The method of claim 1, wherein the sensitivity level indicates a need to protect at least one of confidentiality and integrity of the information maintained by the information resource.

6. The method of claim 1, wherein the criticality level further comprises one of critical, business-controlled criticality, and non-critical.

7. The method of claim 1, wherein the mandatory security requirements comprise security requirements that must be implemented based on the determined sensitivity level and the criticality level.

8. The method of claim 1, wherein the discretionary security requirements comprise security requirements that are recommended by a user.

9. The method of claim 1, wherein the discretionary security requirements treated as mandatory comprise security requirements that would have been treated as discretionary, but based on user input, must be treated as mandatory.

10. The method of claim 1, wherein determining the security requirements further comprises determining a baseline security requirement if the determined sensitivity level is non-sensitive and the criticality level is non-critical.

11. The method of claim 1, wherein determining the security requirements further comprises determining the security requirements to include baseline security requirements, mandatory security requirements, and discretionary security requirements if the determined sensitivity level is one of sensitive and business-controlled sensitivity and the criticality level is one of critical or business-controlled criticality.

12. The method of claim 1, wherein determining the criticality level comprises determining a need for at least one of continuous availability of the information resource and integrity of the information resource.

13. The method of claim 1, wherein the individual data elements comprise at least one of a name, a phone number, an address, and a social security number.

14. A system for determining security requirements for an information resource, the system comprising:

a memory storage for maintaining a database; and a processing unit coupled to the memory storage, wherein the processing unit is operative to determine a privacy policy governing information maintained by the information resource;

assign sensitivity levels to individual data elements based on user input;

determine a sensitivity level for the information resource based on the sensitivity levels of the individual data elements, the determined sensitivity level of the information resource corresponding to the highest sensitivity level of the individual data elements;

assign the determined highest sensitivity level to the information resource to implement the privacy policy;

determine a criticality level associated with the information resource, the criticality level corresponding to an impact if the information resource were to become unavailable;

determine security requirements for the information resource based on at least one of the determined sensitivity level and the criticality level to enforce the privacy policy governing the information maintained by the information resource; and store the determined sensitivity level, the criticality level, and the security requirements in the database;

wherein the security requirements include at least one of baseline security requirements, mandatory security requirements, discretionary security requirements, and discretionary security requirements treated as mandatory; and wherein the baseline security requirements comprise security requirements to protect infrastructure.

15. The system of claim 14, wherein the processing unit is further operative to determine a recovery time objective for the information resource.

16. The system of claim 14, wherein the processing unit is further operative to ensure that information used in determining the security requirements adheres to privacy requirements.

17. The system of claim 14, the sensitivity level comprising one of sensitive, business-controlled sensitivity, and non-sensitive.

18. The system of claim 14, wherein the sensitivity level indicates a need to protect confidentiality and integrity of the information maintained by the information resource.

19. The system of claim 14, the criticality level comprising one of critical, business-controlled criticality, and non-critical.

20. The system of claim 14, wherein the mandatory security requirements comprise security requirements that must be implemented based on the determined sensitivity level and the criticality level.

21. The system of claim 14, wherein the discretionary security requirements comprise security requirements that are recommended by a user.

22. The system of claim 14, wherein the discretionary security requirements treated as mandatory comprise security requirements that would have been treated as discretionary, but based on user input, must be treated as mandatory.

23. The system of claim 14, the processing unit being further operative to determine a baseline security requirement if the determined sensitivity level is non-sensitive and the criticality level is non-critical.

24. The system of claim 14, the processing unit being further operative to determine the security requirements to include baseline security requirements, mandatory security requirements, and discretionary security requirements if the determined sensitivity level is one of sensitive and business-controlled sensitivity and the criticality level is one of critical and business-controlled criticality.

25. The system of claim 14, wherein determining the criticality level comprises determining a need for at least one of continuous availability of the information resource and integrity of the information resource.

26. The system of claim 14, wherein the individual data elements comprise at least one of a name, a phone number, an address, and a social security number.

27. A computer-readable hardware medium which stores a set of instructions which when executed performs a method for determining security requirements for an information resource, the method comprising:
   determining a privacy policy governing information maintained by the information resource;
   assigning sensitivity levels to individual data elements based on user input;
   determining a sensitivity level for the information resource based on the sensitivity levels of the individual data elements, the determined sensitivity level of the information resource corresponding to the highest sensitivity level of the individual data elements;
   assigning the determined highest sensitivity level to the information resource to implement the privacy policy;
   determining a criticality level associated with the information resource, the criticality level corresponding to an impact if the information resource were to become unavailable; and
   determining security requirements for the information resource based on at least one of the determined sensitivity level and the criticality level to enforce the privacy policy governing the information maintained by the information resource;
   wherein the security requirements include at least one of baseline security requirements, mandatory security requirements, discretionary security requirements, and discretionary security requirements treated as mandatory; and
   wherein the baseline security requirements comprise security requirements to protect infrastructure.

28. The computer-readable hardware medium of claim 27, the method executed by the set of instructions further comprising determining a recovery time objective for the information resource.

29. The computer-readable hardware medium of claim 27, the method executed by the set of instructions further comprising ensuring that information used in determining the security requirements adheres to privacy requirements.

30. The computer-readable hardware medium of claim 27, wherein the sensitivity level further comprises one of sensitive, business-controlled sensitivity, and non-sensitive.

31. The computer-readable hardware medium of claim 27, wherein the sensitivity level indicates a need to protect at least one of confidentiality and integrity of the information maintained by the information resource.

32. The computer-readable hardware medium of claim 27, wherein the criticality level further comprises one of critical, business-controlled criticality, and non-critical.

33. The computer-readable hardware medium of claim 27, wherein the mandatory security requirements comprise security requirements that must be implemented based on the determined sensitivity level and the criticality level.

34. The computer-readable hardware medium of claim 27, wherein the discretionary security requirements comprise security requirements that are recommended by a user.

35. The computer-readable hardware medium of claim 27, wherein the discretionary security requirements treated as mandatory comprise security requirements that would have been treated as discretionary, but based on user input, must be treated as mandatory.

36. The computer-readable hardware medium of claim 27, wherein determining the security requirements further comprises determining a baseline security requirement if the determined sensitivity level is non-sensitive and the criticality level is non-critical.

37. The computer-readable hardware medium of claim 27, wherein determining the security requirements further comprises determining the security requirements to include baseline security requirements, mandatory security requirements, and discretionary security requirements if the determined sensitivity level is one of sensitive and business-controlled sensitivity and the criticality level is one of critical or business-controlled criticality.

38. The computer-readable hardware medium of claim 27, wherein determining the criticality level comprises determining a need for at least one of continuous availability of the information resource and integrity of the information resource.

39. The computer-readable hardware medium of claim 27, wherein the individual data elements comprise at least one of a name, a phone number, an address, and a social security number.

40. A method for determining security requirements for an information resource, using a computer system, the method comprising:
   assigning, by the computer system, sensitivity levels to individual data elements based on user input;
   determining, by the computer system, a sensitivity level for the information resource based on the sensitivity levels of the individual data elements, the determined sensitivity level of the information resource corresponding to the highest sensitivity level of the individual data elements;
   assigning, by the computer system, the determined highest sensitivity level to the information resource to implement privacy requirements of information maintained by the information resource;
   determining, by the computer system, a criticality level associated with the information resource, the criticality level corresponding to an impact if the information resource were to become unavailable; and
   determining, by the computer system, security requirements for the information resource based on at least one of the determined sensitivity level and the criticality level;
   wherein the security requirements include at least one of baseline security requirements, mandatory security requirements, discretionary security requirements, and discretionary security requirements treated as mandatory; and
   wherein the baseline security requirements comprise security requirements to protect infrastructure.

41. The method of claim 40, wherein the sensitivity level indicates a need to meet privacy requirements by protecting at least one of confidentiality and integrity of the information maintained by the information resource.

42. The method of claim 40, wherein the individual data elements comprise at least one of a name, a phone number, an address, and a social security number.

43. A system for determining security requirements for an information resource, the system comprising:
   a memory storage for maintaining a database; and
   a processing unit coupled to the memory storage, wherein the processing unit is operative to
      assign sensitivity levels to individual data elements based on user input;
      determine a sensitivity level for the information resource based on the sensitivity levels of the individual data elements, the determined sensitivity level of the information resource corresponding to the highest sensitivity level of the individual data elements;
      assign the determined highest sensitivity level to the information resource to implement privacy requirements of information maintained by the information resource;
      determine a criticality level associated with the information resource, the criticality level corresponding to an impact if the information resource were to become unavailable;
      determine security requirements for the information resource based on at least one of the determined sensitivity level and the criticality level; and
      store the determined sensitivity level, the criticality level, and the security requirement in the database;
      wherein the security requirements include at least one of baseline security requirements, mandatory security requirements, discretionary security requirements, and discretionary security requirements treated as mandatory; and
      wherein the baseline security requirements comprise security requirements to protect infrastructure.

44. The system of claim 43, wherein the sensitivity level indicates a need to meet privacy requirements by protecting the confidentiality and integrity of the information maintained by the information resource.

45. The system of claim 43, wherein the individual data elements comprise at least one of a name, a phone number, an address, and a social security number.

46. A computer-readable hardware medium which stores a set of instructions which when executed performs a method for determining security requirements for an information resource, the method executed by the set of instructions comprising:
   assigning sensitivity levels to individual data elements based on user input;
   determining a sensitivity level for the information resource based on the sensitivity levels of the individual data elements, the determined sensitivity level of the information resource corresponding to the highest sensitivity level of the individual data elements;
   assigning the determined highest sensitivity level to the information resource to implement privacy requirements of information maintained by the information resource;
   determining a criticality level associated with the information resource, the criticality level corresponding to an impact if the information resource were to become unavailable; and
   determining security requirements for the information resource based on at least one of the determined sensitivity level and the criticality level;
   wherein the security requirements include at least one of baseline security requirements, mandatory security requirements, discretionary security requirements, and discretionary security requirements treated as mandatory; and
   wherein the baseline security requirements comprise security requirements to protect infrastructure.

47. The computer-readable hardware medium of claim 46, wherein the sensitivity level indicates a need to meet privacy requirements by protecting at least one of the confidentiality and integrity of the information maintained by the information resource.

48. The computer-readable hardware medium of claim 46, wherein the individual data elements comprise at least one of a name, a phone number, an address, and a social security number.

* * * * *